US011945593B2

(12) United States Patent
Kierbel (10) Patent No.: US 11,945,593 B2
(45) Date of Patent: Apr. 2, 2024

(54) PROPULSION SYSTEM FOR AN AIRCRAFT, SAID PROPULSION SYSTEM COMPRISING A FUEL CELL

(71) Applicant: Airbus SAS, Blagnac (FR)

(72) Inventor: Daniel Kierbel, Blagnac (FR)

(73) Assignee: Airbus SAS, Blagnac (FR)

( * ) Notice: Subject to any disclaimer, the term of this patent is extended or adjusted under 35 U.S.C. 154(b) by 121 days.

(21) Appl. No.: 17/783,117

(22) PCT Filed: Oct. 5, 2020

(86) PCT No.: PCT/EP2020/077849
§ 371 (c)(1),
(2) Date: Jun. 7, 2022

(87) PCT Pub. No.: WO2021/115660
PCT Pub. Date: Jun. 17, 2021

(65) Prior Publication Data
US 2022/0411083 A1 Dec. 29, 2022

(30) Foreign Application Priority Data
Dec. 9, 2019 (FR) ...................................... 1913969

(51) Int. Cl.
*B64D 27/24* (2006.01)
*B64D 37/04* (2006.01)
(Continued)

(52) U.S. Cl.
CPC ............. *B64D 27/24* (2013.01); *B64D 37/04* (2013.01); *B64D 37/06* (2013.01); *B64D 37/30* (2013.01);
(Continued)

(58) Field of Classification Search
CPC ........ B64D 27/24; B64D 37/04; B64D 37/06; B64D 37/30; H01M 2250/20
See application file for complete search history.

(56) References Cited

U.S. PATENT DOCUMENTS

2017/0240291 A1\* 8/2017 Kim ...................... B64C 39/024
2021/0269152 A1\* 9/2021 Wankewycz ........... B64D 29/02

FOREIGN PATENT DOCUMENTS

CN 107264792 A 10/2017
EP 1641064 A1 3/2006

OTHER PUBLICATIONS

French Search Report; priority document.
International Search Report; priority document.

\* cited by examiner

*Primary Examiner* — Richard G Davis
(74) *Attorney, Agent, or Firm* — Greer, Burns & Crain, Ltd.

(57) ABSTRACT

A propulsion system comprising a nacelle with an air channel along a longitudinal direction, an electric motor whose output drives a propeller, and a fuel cell, comprising a core outside the air channel, open channels, each of which has an inlet and an outlet opening in the air channel, and, for each open channel, a fuel chamber, an electrolyte between the open channel and the fuel chamber, a cathode, and an anode, each open channel having an inlet surface area which is less than the surface area of an intermediate area between the inlet and the outlet, the surface area of the outlet being smaller than the surface area of the intermediate area. Such a system makes it possible to have the fuel cell close to the electric motor, thereby reducing the lengths of the electrical conductors between them, and consequently improving the operation of the fuel cell.

11 Claims, 7 Drawing Sheets

(51) Int. Cl.
*B64D 37/06* (2006.01)
*B64D 37/30* (2006.01)

(52) U.S. Cl.
CPC ..... *B64D 2221/00* (2013.01); *H01M 2250/20* (2013.01)

Fig. 9 ically high, and this generates high temperatures in the electrical conductors, which must therefore be of large diameter or be cooled.

PROPULSION SYSTEM FOR AN AIRCRAFT, SAID PROPULSION SYSTEM COMPRISING A FUEL CELL

CROSS-REFERENCES TO RELATED APPLICATIONS

This application claims the benefit of the International Application No. PCT/EP2020/077849, filed on Oct. 5, 2020, and of the French patent application No. 1913969 filed on Dec. 9, 2019, the entire disclosures of which are incorporated herein by way of reference.

FIELD OF THE INVENTION

The present invention relates to a propeller propulsion system for an aircraft, the propeller propulsion system comprising a fuel cell, and to an aircraft comprising at least one such propulsion system.

BACKGROUND OF THE INVENTION

In order to move, an aircraft comprises a propulsion system comprising an engine and a propeller. The engine generates a rotary movement which is transmitted to the propeller.

It is known to use a heat engine to cause the propeller to move. Such a heat engine usually runs on kerosene. It is also known to use an electric motor to cause the propeller to move. The electric motor is supplied with electricity from an electric generator which is positioned at a distance from the electric motor, requiring the provision of relatively long electrical conductors between the electric generator and the electric motor.

The voltage of the current flowing in these electrical conductors is relatively high, and this generates high temperatures in the electrical conductors, which must therefore be of large diameter or be cooled.

It is also known to use fuel cells for generating electricity and supplying an electric motor. With this technology, the fuel cell must be supplied with dioxygen, and for this purpose dioxygen conduits are usually installed to guide the dioxygen towards the fuel cell.

What is needed is to find a propulsion system using electric motors in which the electricity supply is provided in the most integrated way possible.

SUMMARY OF THE INVENTION

One object of the present invention is to propose a propeller propulsion system comprising a fuel cell whose architecture allows greater integration, by limiting the length of the electrical conductors between the electric motor and the fuel cell, and by limiting the number of conduits guiding the dioxygen towards the fuel cell.

For this purpose, a propulsion system for an aircraft is proposed, the propulsion system comprising:

a nacelle having an annular air channel around a longitudinal direction X, opening at the front at an inlet opening and at the rear at an ejection opening,
an electric motor fixed inside the nacelle and having an output on which is mounted a shaft parallel to the longitudinal direction X, a first electrical terminal, and a second electrical terminal,
a propeller placed in front of the inlet opening and driven in rotation by the shaft,
a fuel cell, comprising:
a core around the longitudinal direction X and outside the air channel,
open channels around the core, each open channel having an open inlet in the air channel and an open outlet in the air channel downstream of the open inlet, relative to the direction of the air flow in the air channel,
for each open channel, a fuel chamber supplied with fuel,
for each pair comprising an open channel and a fuel chamber, an electrolyte between the open channel and the fuel chamber,
between each open channel and the neighboring electrolyte, a cathode,
between each fuel chamber and the neighboring electrolyte, an anode,
the anodes being electrically connected to the first electrical terminal, and the cathodes being electrically connected to the second electrical terminal,
each open channel having an inlet surface area which is less than the surface area of an intermediate area between the inlet and the outlet, the surface area of the outlet being smaller than the surface area of the intermediate area.

Such a propulsion system therefore makes it possible to have a fuel cell which is close to the electric motor, thereby reducing the lengths of the electrical conductors between them, and which uses the dioxygen of the air flowing in the propulsion system.

According to a particular embodiment, the open channels are channels coaxial with each other around the longitudinal direction X; between two consecutive open channels, the fuel cell comprises an annular fuel chamber; and between the fuel chamber and each open channel, the fuel cell comprises an electrolyte.

According to another particular embodiment, the open channels are positioned side by side and are distributed angularly around the longitudinal direction X; around each open channel, the fuel cell comprises an annular electrolyte around the axis of the open channel, and, around the electrolyte, an annular fuel chamber around the axis of the open channel.

Advantageously, the propulsion system comprises, at the inlet opening in the air channel, a compressor which is driven in rotation around the longitudinal direction X by the shaft.

Advantageously, the propulsion system comprises, at the ejection opening in the air channel, a turbine which is driven in rotation around the longitudinal direction X by the shaft.

Advantageously, the propulsion system comprises at least one combustion chamber having an inlet fluidly connected to at least one outlet of a fuel chamber and an outlet fluidly connected to the air channel upstream of the turbine.

Advantageously, the electric motor is equipped with a gearbox fitted between the motor output and the shaft.

Advantageously, the shaft comprises an upstream shaft integral with the propeller and a downstream shaft integral with the electric motor, and the propulsion system comprises a clutch device fitted between the downstream shaft and the upstream shaft.

Advantageously, the propulsion system comprises a thermally insulating layer placed between the fuel cell and the electric motor.

The invention also proposes an aircraft comprising a fuel tank and a propulsion system according to any of the aforementioned variants, in which the inlet of each fuel chamber is fluidly connected to the tank by a supply line.

Advantageously, the supply line is in contact with the electric motor.

3

BRIEF DESCRIPTION OF THE DRAWINGS

The abovementioned characteristics of the invention, along with others, will become more clearly apparent on reading the following description of an example of embodiment, the description being given with reference to the appended drawings, in which.

DETAILED DESCRIPTION OF THE PREFERRED EMBODIMENTS

Figure 1:
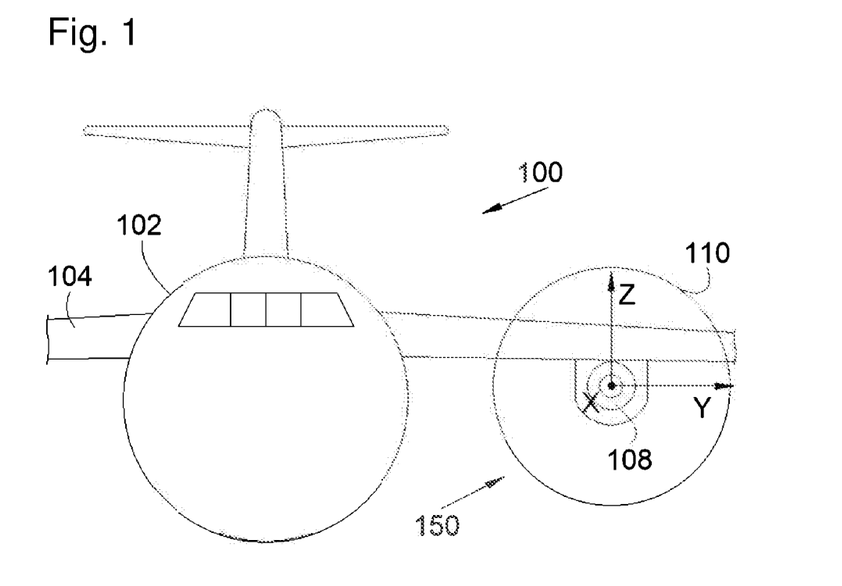
FIG. 1 is a front view of an aircraft comprising a propulsion system according to the invention.

In the following description, terms relating to a position are considered to refer to an aircraft in an advancing position, that is to say, as shown in FIG. 1, where the direction of the axis X shows the direction of advance of the aircraft.

FIG. 1 shows an aircraft 100 which has a fuselage 102, on either side of which is fixed a wing 104. At least one propeller propulsion system 150 is fixed under each wing 104. In the embodiment of the invention shown in FIG. 1, there is one propulsion system 150 for each wing 104.

In the following description, and by convention, X denotes the longitudinal direction of the propulsion system 150 positively orientated in the direction of advance of the aircraft 100, Y denotes the transverse direction of the propulsion system 150 which is horizontal when the aircraft is on the ground, and Z denotes the vertical direction or vertical height when the aircraft is on the ground, these three directions X, Y and Z being orthogonal to each other.

Each propulsion system 150 comprises a propeller 110 and an electric motor 108 which is fixed to the wing 104 and has an output on which is fitted a shaft which drives the propeller 110 in rotation when the electric motor 108 is in operation. The axes of rotation of the shaft and the propeller 110 are parallel to the longitudinal direction X, and, in the embodiments shown in the various figures, the axes of rotation coincide with the longitudinal direction X.

Figure 2:
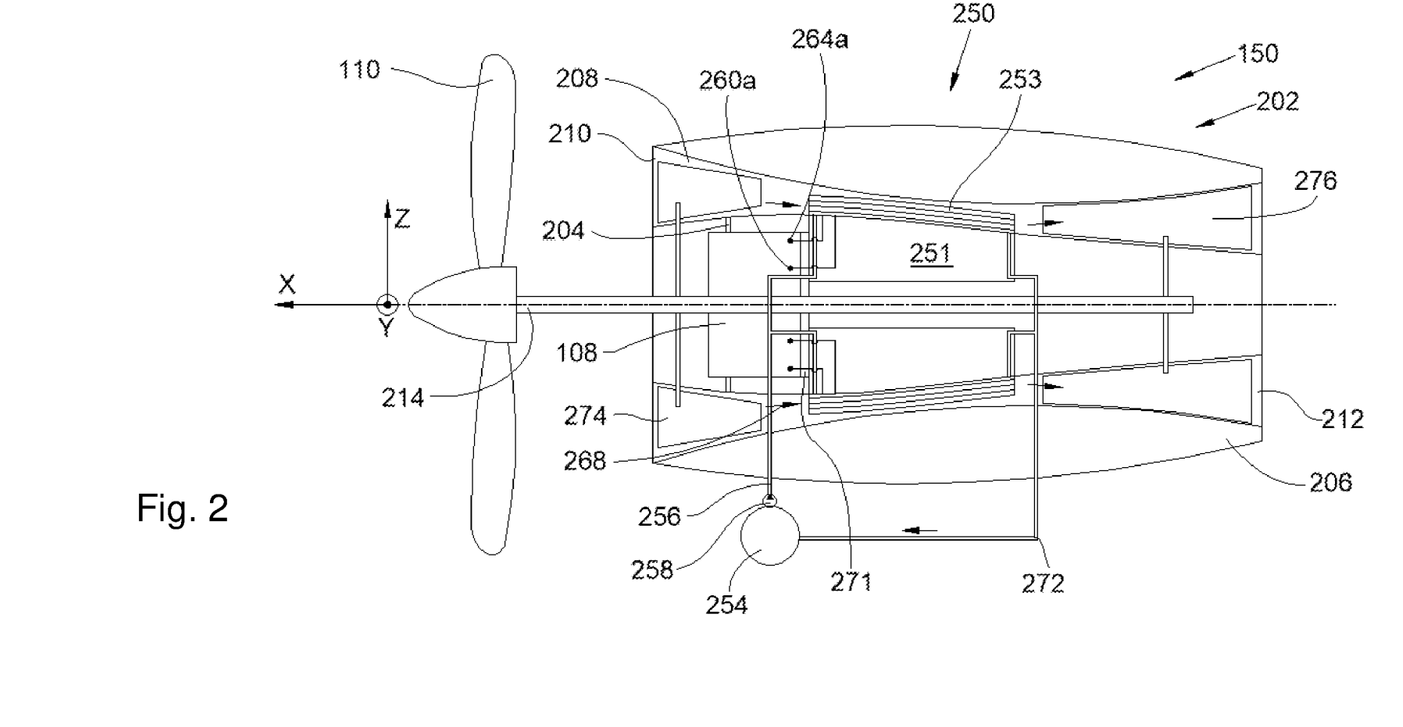
FIG. 2 is a sectional side view of a propulsion system according to a first embodiment of the invention.

FIG. 2 shows the propulsion system 150 according to a first embodiment of the invention. The propulsion system 150 comprises a nacelle 202 having a structure 204 and outer cowlings 206 which are fixed to the structure 204 and form an aerodynamic outer surface. The nacelle 202 also has an air channel 208 which is annular around the longitudinal direction X, and which opens at the front at an inlet opening 210 and at the rear at an ejection opening 212.

The electric motor 108 is fixed to the structure 204 inside the nacelle 202 and projects its shaft 214 forwards, and the

4 propeller 110 is driven in rotation by the shaft 214 and is positioned in front of the inlet opening 210.

The propulsion system 150 comprises a fuel cell 250, which is a cell in which the generation of an electrical potential takes place as a result of the oxidation on an electrode of a reducing fuel in liquid or gaseous form, for example dihydrogen and/or methane, or ammonia solution, combined with the reduction on the other electrode of an oxidizer such as dioxygen from the air.

The fuel cell 250 is fixed to the structure 204 inside the nacelle 202 behind the electric motor 108, comprises a plurality of annular layers around the longitudinal direction X.

The fuel cell 250 comprises a core 251 which is located around the longitudinal direction X, in this case around the shaft 214, and outside the air channel 208, that is to say, within the inner wall of the air channel 208. The core 251 serves to fix the fuel cell 250 to the structure 204.

The fuel cell 250 also comprises open channels 253, each open channel 253 having an open inlet in the air channel 208 and an open outlet in the air channel 208 downstream of the open inlet, relative to the direction of the air flow in the air channel 208. This distribution provides better distribution of the dioxygen in the open channel 253.

Thus, the air entering through the inlet opening 210 enters an open channel 253 through an inlet and passes out of the open channel 253 through an outlet, to return to the air channel 208 and the ejection opening 212. Each inlet faces the air flow (arrow 268) entering through the inlet opening 210.

Each open inlet allows the air containing dioxygen to be introduced into each open channel 253, and the open outlet allows the discharge of the air with a reduced dioxygen content and the water produced by the fuel cell 250.

Thus, the supply of dioxygen for the fuel cell does not require a special conduit. Each open channel 253 forms a dioxygen chamber.

Here, each open inlet is orientated towards the inlet opening 210, and each open outlet is orientated towards the ejection outlet 212.

Figure 3:
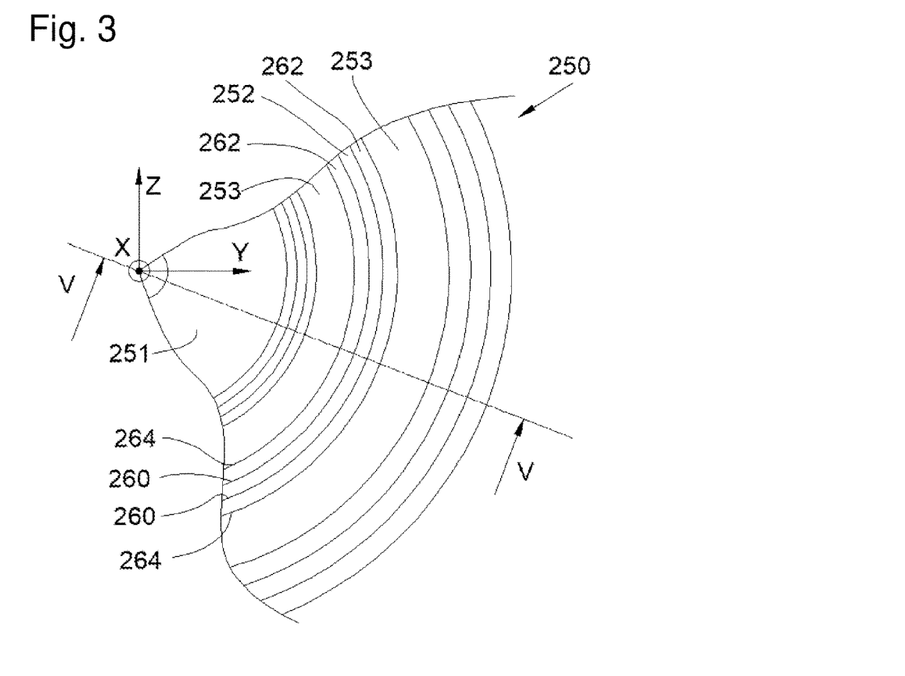
FIG. 3 is a partial front view of a fuel cell according to a first arrangement.

FIG. 3 shows a first arrangement in which the open channels 253 are channels which are coaxial with each other around the longitudinal direction X.

Between two consecutive open channels 253, the fuel cell 250 comprises a fuel chamber 252 which is annular around the longitudinal direction X, and between the fuel chamber 252 and each open channel 253 the fuel cell 250 comprises an electrolyte 262 which is annular around the longitudinal direction X.

Figure 4:
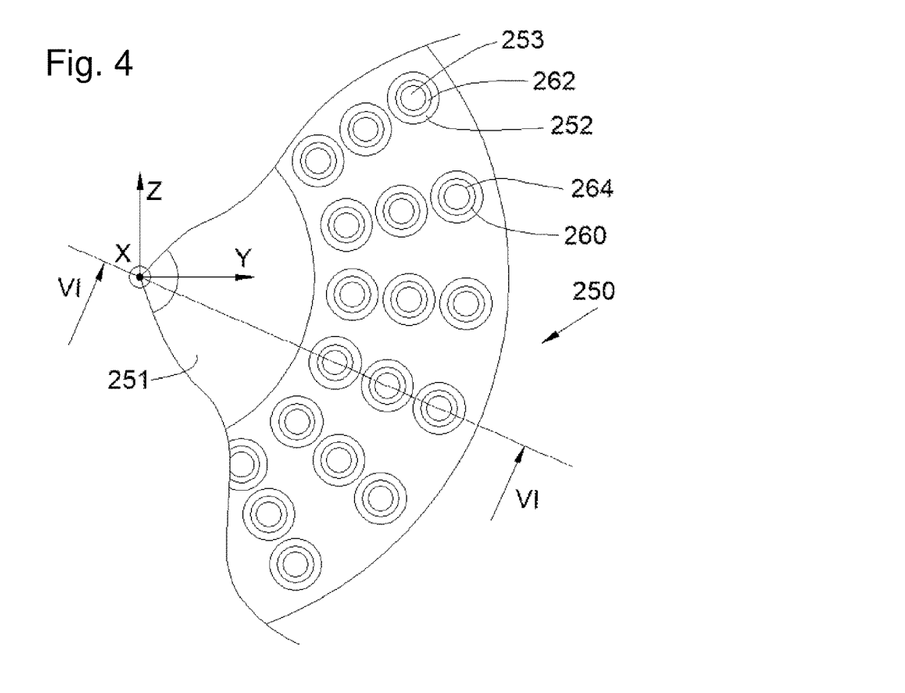
FIG. 4 is a partial front view of a fuel cell according to a second arrangement.

FIG. 4 shows a second arrangement in which the open channels 253 are channels, cylindrical in this case, positioned side by side and distributed angularly around the longitudinal direction X.

Around each open channel 253, the fuel cell 250 comprises an electrolyte 262 which is annular around the axis of the open channel 253 and, around the electrolyte 262, a fuel chamber 252 which is annular around the axis of the open channel 253. The axis of the open channel 253 is parallel to the longitudinal direction X in this case.

The walls separating the various layers are kept in position, by spacers for example.

Between each open channel 253 and the neighboring electrolyte 262, the fuel cell 250 comprises a cathode 264, and between each fuel chamber 252 and the neighboring electrolyte 262 the fuel cell 250 comprises an anode 260.

Thus, in general terms, the fuel cell 250 comprises, for each open channel 253, a fuel chamber 252 supplied with fuel, and for each pair comprising an open channel 253 and a fuel chamber 252, an electrolyte 262 between the open channel 253 and the fuel chamber 252.

The anodes 260 are electrically connected to a first electrode 260a which is electrically connected to a first electrical terminal of the electric motor 108, and the cathodes 264 are electrically connected to a second electrode 264a which is electrically connected to a second electrical terminal of the electric motor 108.

Each fuel chamber 252 comprises at least one inlet through which fuel is introduced, and at least one outlet through which the unused fuel is extracted. To provide better distribution of the fuel in the fuel chamber 252, the inlet or inlets and the outlet or outlets are placed at different ends of the fuel chamber 252. The inlet of each fuel chamber 252 is fluidly connected by a supply line 256 to a tank 254 containing fuel and having a pump 258 for driving the fuel into the supply line 256. The tank 254 is installed in the aircraft 100, in the wings 104 or in the fuselage 102, for example.

The supply line 256 carries fuel at low temperature and is in contact with the electric motor 108, making it possible to reduce the temperature of the latter and thereby improve its efficiency.

In the embodiment of FIG. 2, the outlet of the fuel chamber 252 is fluidly connected by a return line 272 to the tank 254, for the purpose of recovering the unused fuel and recirculating it.

Figure 5:
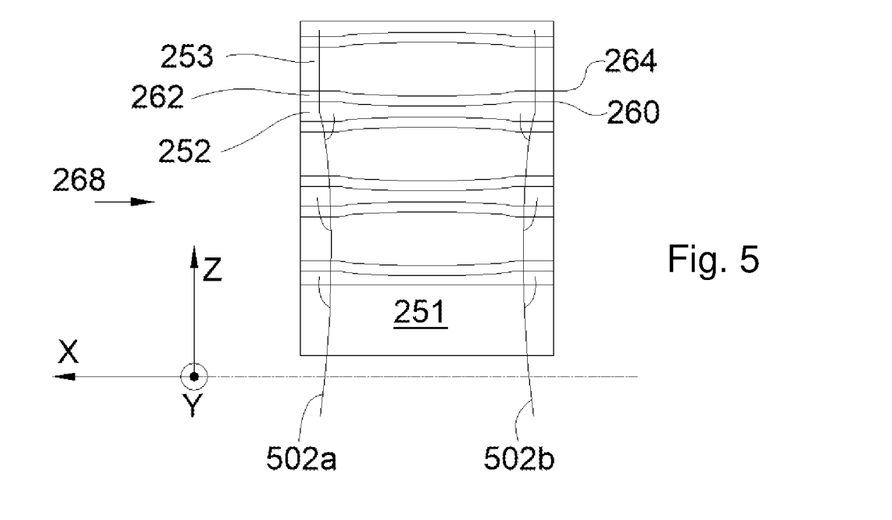
FIG. 5 is a sectional view of the fuel cell taken along the line V-V of FIG. 3.

FIG. 5 shows a cross section through the fuel cell 250 of FIG. 3.

Figure 6:
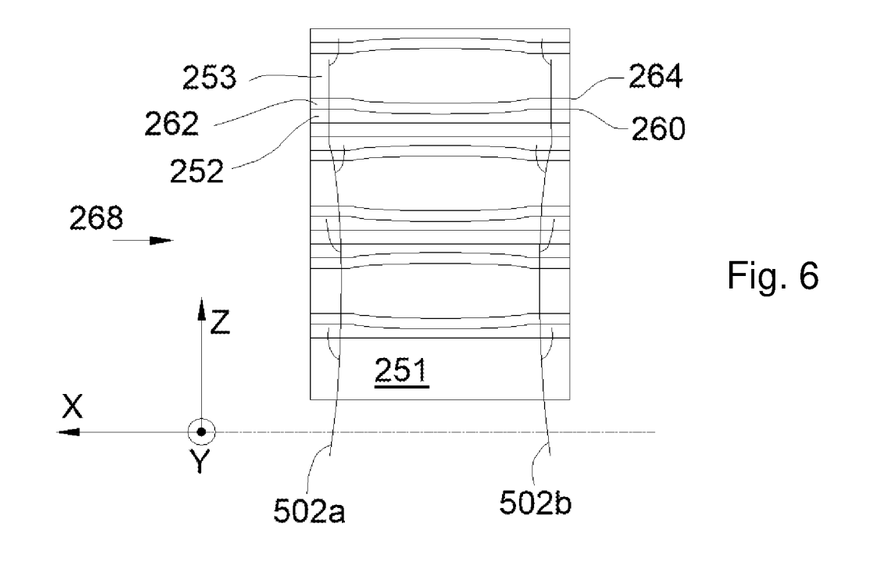
FIG. 6 is a sectional view of the fuel cell taken along the line VI-VI of FIG. 4.

FIG. 6 shows a cross section through the fuel cell 250 of FIG. 4.

Each fuel chamber 252 is supplied with fuel via the inlet lines 502a which run inside the fuel cell 250 and are fluidly connected to the supply line 256, and the fuel is discharged from each fuel chamber 252 via the outlet lines 502b which run inside the fuel cell 250 and are fluidly connected to the return line 272.

At the same time, the fuel cell 250 is cooled, at least partially, by the air passing through the open channels 253. Evidently, an additional cooling system may be installed and may be of any kind known to those skilled in the art, for example a heat exchanger.

The fuel cell 250, when arranged in this way, enables the external air flowing in the air channel 208 to be used for its operation and for cooling, and its integration into the nacelle 202 limits the length of the electrical conductors between the electric motor 108 and the fuel cell 250.

In order to achieve good heat exchange in the open channel 253 and good dioxygen exchange for electricity generation, each open channel 253 has a tapered cross section along the path of the air in the open channel 253.

As shown in FIGS. 5 and 6, the open channel 253 has an inlet surface area which is less than the surface area of the intermediate area between the inlet and the outlet, and surface area of the outlet is smaller than the surface area of the intermediate area. Each surface area corresponds to a cross section on a plane perpendicular to the longitudinal direction X.

With such an installation, a Venturi effect is produced, enabling the velocity of the air flow to be reduced in the intermediate area and then accelerated when it leaves the intermediate area.

According to a particular embodiment, the surface area of the inlet and the surface area of the outlet are designed to produce a velocity of Mach 0.6, and the surface area of the intermediate area is designed to produce a velocity of Mach 0.3.

In order to increase the flow rate of the air entering the air channel 208, the propulsion system 150 comprises, at the inlet opening 210 in the air channel 208, a compressor 274, for example in the form of vanes driven in rotation around the longitudinal direction X by the shaft 214.

It is also possible to make the supply line 256 pass through the air channel 208 in the vicinity of the compressor 274, in order to cool the air in the air channel 208 and, consequently, the compressor 274.

In order to increase the flow rate of the air leaving the air channel 208 and to increase the heat dissipation, the propulsion system 150 comprises, at the ejection opening 212 in the air channel 208, a turbine 276, for example in the form of vanes driven in rotation around the longitudinal direction X by the shaft 214. The shaft 214 then passes through the fuel cell 250 from the front to the rear.

The turbine 276 may also allow the shaft 214 to be driven, thereby decreasing the workload on the electric motor 108 and thus reducing the electricity demand.

Figure 7:
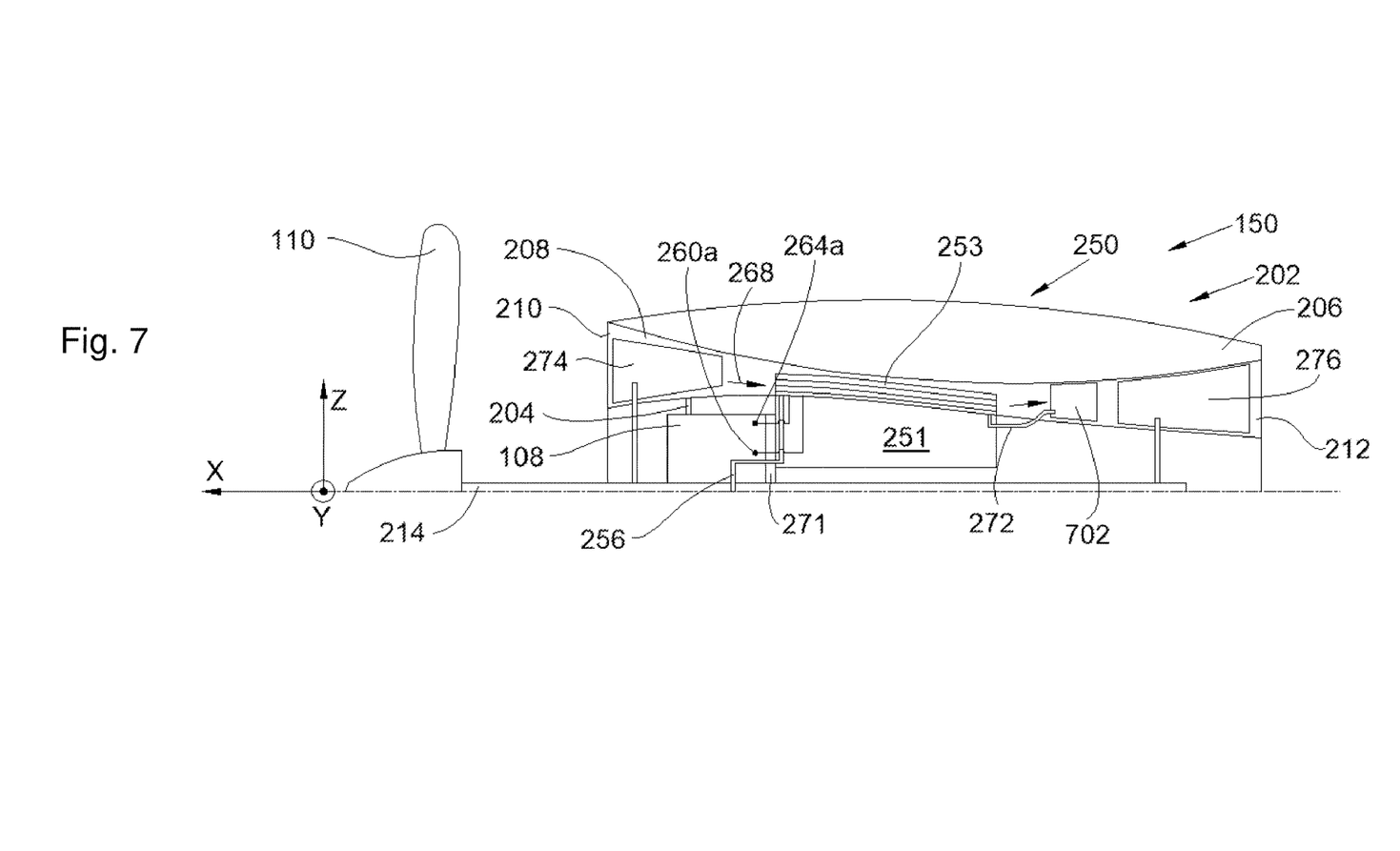
FIG. 7 is a view similar to that of FIG. 2 for a propulsion system according to a second embodiment of the invention.

FIG. 7 shows a second embodiment, for which the propulsion system comprises at least one combustion chamber 702 having an inlet fluidly connected to at least one outlet of a fuel chamber 252 through the return line 272. The burnt gases that are in the combustion chamber 702 then flow out through an outlet of the combustion chamber 702, which is fluidly connected to the air channel 208 upstream of the turbine 276. Such an arrangement makes it possible to burn the excess fuel, to generate additional thrust, and to produce heat for the turbine 276. Fuel may also be introduced into the combustion chamber 702 to increase combustion. Then the propulsion system 150 only discharges water and excess heat.

Figure 8:
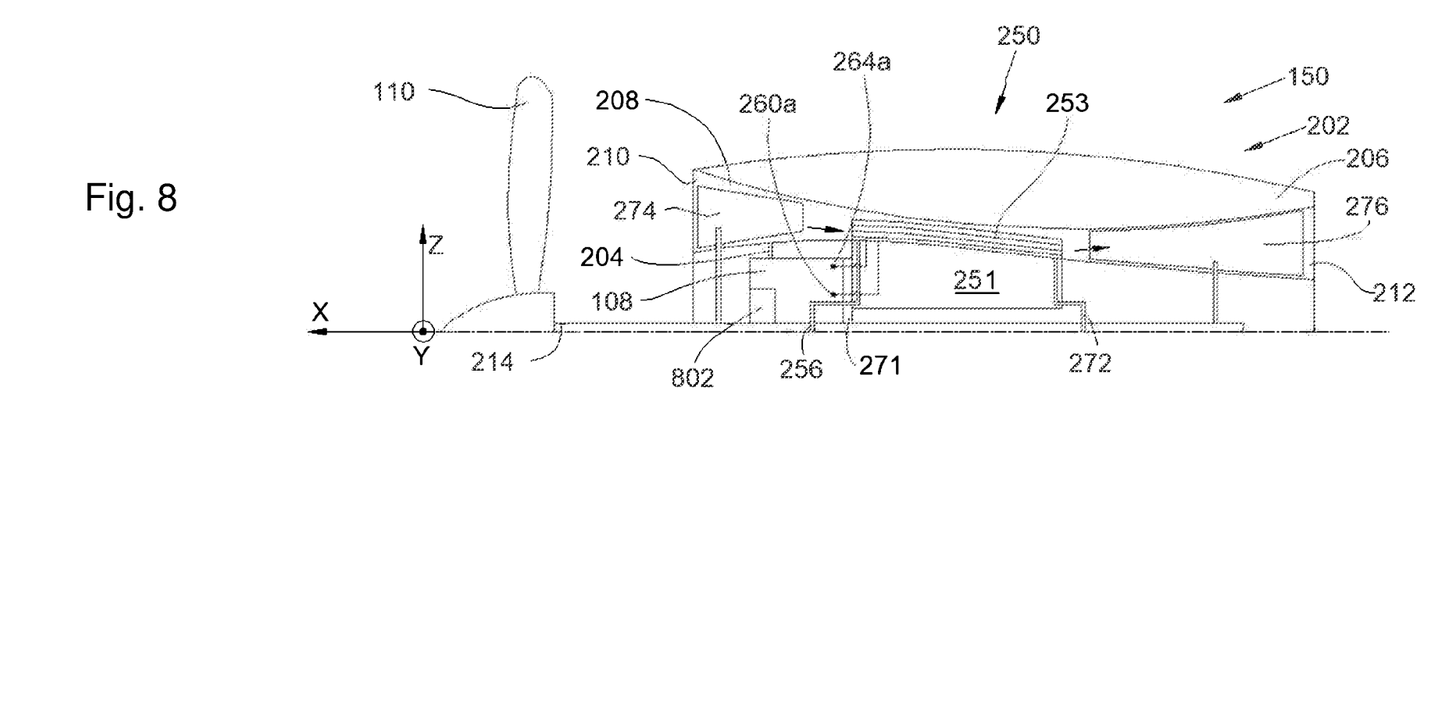
FIG. 8 is a view similar to that of FIG. 2 for a propulsion system according to a third embodiment of the invention.

FIG. 8 shows a third embodiment for which the electric motor 108 is equipped with a gearbox 802 fitted between the motor output and the shaft 214, to allow different rotation velocities of the motor and the shaft 214, and therefore of the propeller 110.

Figure 9:
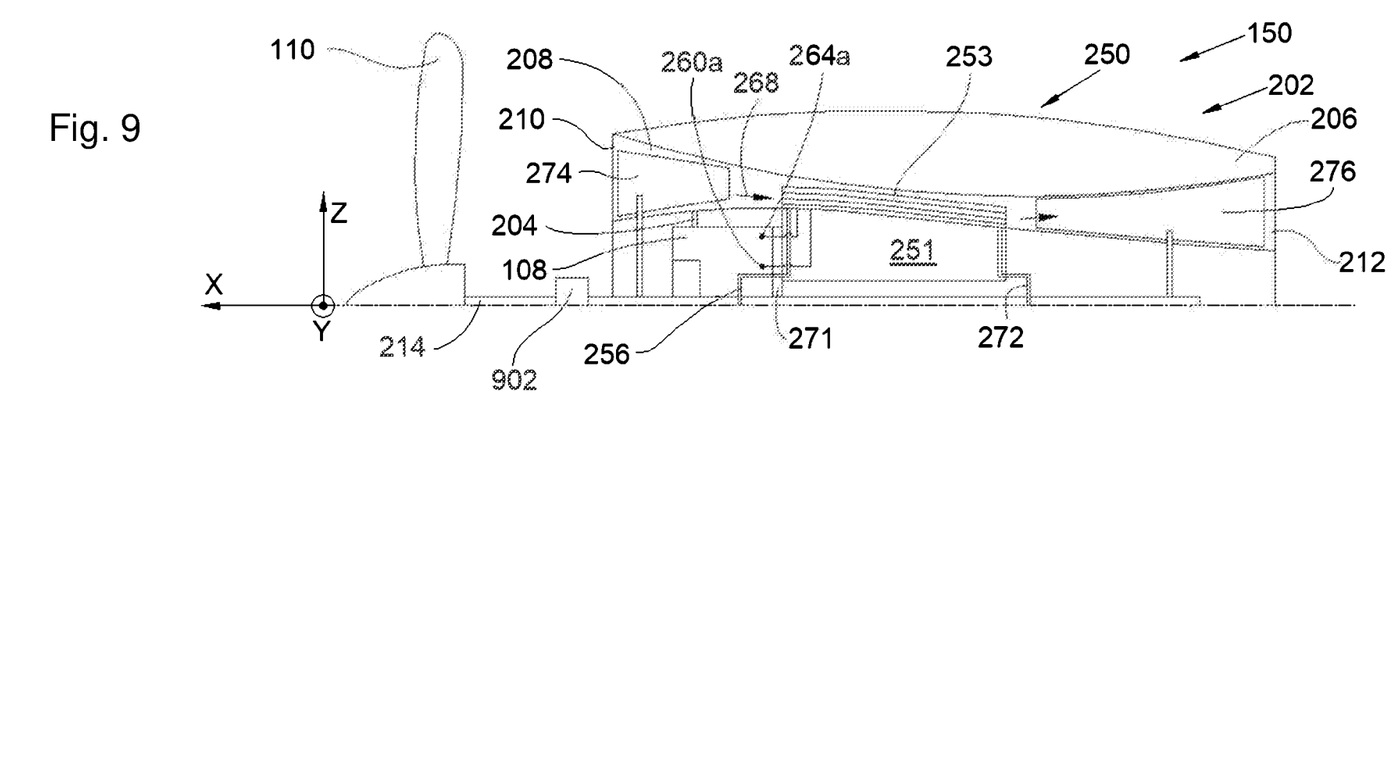
FIG. 9 is a view similar to that of FIG. 2 for a propulsion system according to a fourth embodiment of the invention.

FIG. 9 shows a fourth embodiment, for which the shaft 214 comprises an upstream shaft integral with the propeller 110 and a downstream shaft integral with the electric motor 108, and the propulsion system 150 comprises a clutch device 902 fitted between the downstream shaft and the upstream shaft for the purpose of disengaging the propeller 110.

Evidently, the various embodiments may be combined with each other.

The fuel cell 250 generates high temperatures which may limit the performance of the electric motor 108. In order to limit this effect, the propulsion system 150 comprises a thermally insulating layer 271 which is placed between the fuel cell 250 and the electric motor 108. This thermal insulation may be of the carbon aerogel type, for example.

In the embodiment of FIG. 4, the fuel chambers 252 and the electrolytes 262 are placed around the open channel 253, but it is also possible to place the fuel chamber 252 beside the open channel 253, with the electrolyte 262 placed between them.

The propulsion system 150 and all of its elements are preferably controlled by a controller of the FADEC type, with the aim of, notably, regulating the fuel flow rate, the rotation speed of the motor shaft, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft, the propulsion system comprising:
   a nacelle having an air channel which is annular around a longitudinal direction, and which opens at a front at an inlet opening and at a rear at an ejection opening,
   an electric motor fixed inside the nacelle and having an output on which is mounted a shaft parallel to the longitudinal direction, a first electrical terminal, and a second electrical terminal,
   a propeller placed in front of the inlet opening and driven in rotation by said shaft,
   a fuel cell, comprising:
      a core around the longitudinal direction and outside the air channel,
      open channels around the core, each open channel having an open inlet in the air channel and an open outlet in the air channel downstream of the open inlet, relative to a direction of an air flow in the air channel,
      for each open channel, a fuel chamber supplied with fuel,
      for each pair comprising an open channel and a fuel chamber, an electrolyte between the open channel and the fuel chamber,
      between each open channel and the neighboring electrolyte, a cathode,
      between each fuel chamber and the neighboring electrolyte, an anode, the anodes being electrically connected to the first electrical terminal, and the cathodes being electrically connected to the second electrical terminal,
      each open channel having an inlet surface area which is less than the surface area of an intermediate area between the inlet and the outlet, the surface area of the outlet being smaller than the surface area of the intermediate area.

2. The propulsion system according to claim 1,
   wherein the open channels are cylindrical channels which are coaxial with each other around the longitudinal direction,
   wherein, between two consecutive open channels, the fuel cell comprises an annular fuel chamber, and
   wherein, between the fuel chamber and each open channel, the fuel cell comprises an electrolyte.

3. The propulsion system according to claim 1,
   wherein the open channels are placed side by side and distributed angularly around the longitudinal direction, and
   wherein, around each open channel, the fuel cell comprises an electrolyte which is annular around an axis of the open channel and, around the electrolyte, a fuel chamber which is annular around the axis of the open channel.

4. The propulsion system according to claim 1 further comprising, at the inlet opening in the air channel, a compressor driven in rotation around the longitudinal direction by the shaft.

5. The propulsion system according to claim 1, further comprising, at the ejection opening in the air channel, a turbine driven in rotation around the longitudinal direction by the shaft.

6. The propulsion system according to claim 5, further comprising at least one combustion chamber having an inlet fluidly connected to at least one outlet of a fuel chamber and an outlet fluidly connected to the air channel upstream of the turbine.

7. The propulsion system according to claim 1, wherein the electric motor is fitted with a gearbox located between the motor output and the shaft.

8. The propulsion system according to claim 2,
   wherein the shaft comprises an upstream shaft integral with the propeller and a downstream shaft integral with the electric motor, and
   wherein the propulsion system comprises a clutch device fitted between the downstream shaft and the upstream shaft.

9. The propulsion system according to claim 2, further comprising a thermally insulating layer which is placed between the fuel cell and the electric motor.

10. An aircraft comprising a fuel tank and a propulsion system according to claim 2, wherein the inlet of each fuel chamber is fluidly connected to the tank by a supply line.

11. The aircraft according to claim 10, wherein the supply line is in contact with the electric motor.

* * * * *